(12) United States Patent
Cazals et al.

(10) Patent No.: US 8,613,409 B2
(45) Date of Patent: Dec. 24, 2013

(54) AERODYNAMIC FLIGHT CONTROL SURFACE SAID OF CROCODILE STYLE FOR AIRCRAFT

(75) Inventors: Olivier Cazals, Daux (FR); Thierry Druot, Saint-Jean (FR)

(73) Assignee: Airbus Operations (S.A.S.) (FR)

( * ) Notice: Subject to any disclaimer, the term of this patent is extended or adjusted under 35 U.S.C. 154(b) by 195 days.

(21) Appl. No.: 12/941,230

(22) Filed: Nov. 8, 2010

(65) Prior Publication Data
US 2011/0135472 A1 Jun. 9, 2011

(30) Foreign Application Priority Data
Nov. 10, 2009 (FR) ...................................... 09 57947

(51) Int. Cl.
*B64C 9/00* (2006.01)
*B64C 3/50* (2006.01)
*B64C 9/32* (2006.01)
*B64C 5/10* (2006.01)

(52) U.S. Cl.
USPC ..... 244/217; 244/99.14; 244/90 R; 244/90 A; 244/87; 244/213; 244/215; 244/216

(58) Field of Classification Search
USPC ........ 244/87, 89, 90 A, 90 R, 99.14, 211–217
See application file for complete search history.

(56) References Cited

U.S. PATENT DOCUMENTS

| | | | |
|---|---|---|---|
| 1,974,407 A | | 9/1934 | Barnhart |
| 2,347,230 A | | 4/1944 | Zuck |
| 2,612,329 A | * | 9/1952 | Crandall et al. ............. 244/217 |
| 4,566,657 A | * | 1/1986 | Grow .......................... 244/90 A |
| 4,717,097 A | * | 1/1988 | Sepstrup ...................... 244/217 |
| 5,294,080 A | * | 3/1994 | Ross ............................ 244/215 |
| 5,655,737 A | * | 8/1997 | Williams et al. ............. 244/212 |
| 6,276,641 B1 | * | 8/2001 | Gruenewald et al. ......... 244/213 |
| 6,554,229 B1 | * | 4/2003 | Lam et al. .................... 244/217 |
| 7,101,297 B2 | * | 9/2006 | Larson ............................ 475/4 |
| 7,243,881 B2 | * | 7/2007 | Sakurai et al. ................ 244/212 |
| 2011/0135472 A1 | * | 6/2011 | Cazals et al. .................. 416/23 |

FOREIGN PATENT DOCUMENTS

| | | |
|---|---|---|
| FR | 871113 | 4/1942 |
| FR | 871113 A | 4/1942 |
| GB | 350504 A | 6/1931 |
| GB | 722842 | 2/1955 |
| WO | 2007068450 | 6/2007 |

OTHER PUBLICATIONS

French Search Report and Written opinion dated Jun. 29, 2010.

* cited by examiner

*Primary Examiner* — Tien Dinh
*Assistant Examiner* — Michael Wang
(74) *Attorney, Agent, or Firm* — Lerner, David, Littenberg, Krumholz & Mentlik, LLP

(57) ABSTRACT

A trailing edge aerodynamic airfoil of a load-bearing aerodynamic surface of an aircraft of the crocodile type has two airfoil flaps, with each flap being integral in a forward section with a rotational shaft that determines the axis of rotation of the airfoil flap. In a position called the zero setting, the airfoil flaps are essentially joined and form a rear section of the load-bearing surface, and each airfoil flap is movable in translation independently of the other airfoil flap, relative to the load-bearing surface, with each flap being entrained in rotation relative to the load-bearing surface around its axis of rotation by the motion in translation. The ends of the rotational shaft have extensions guided by runners fastened to these ends and acting conjointly with racks fastened to the load-bearing surface.

12 Claims, 5 Drawing Sheets

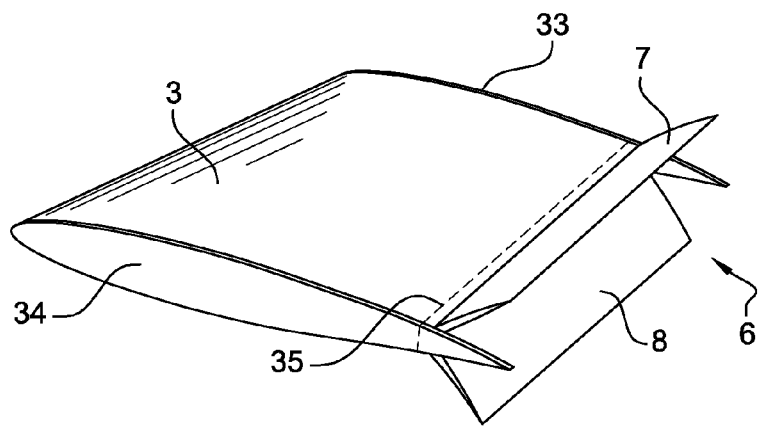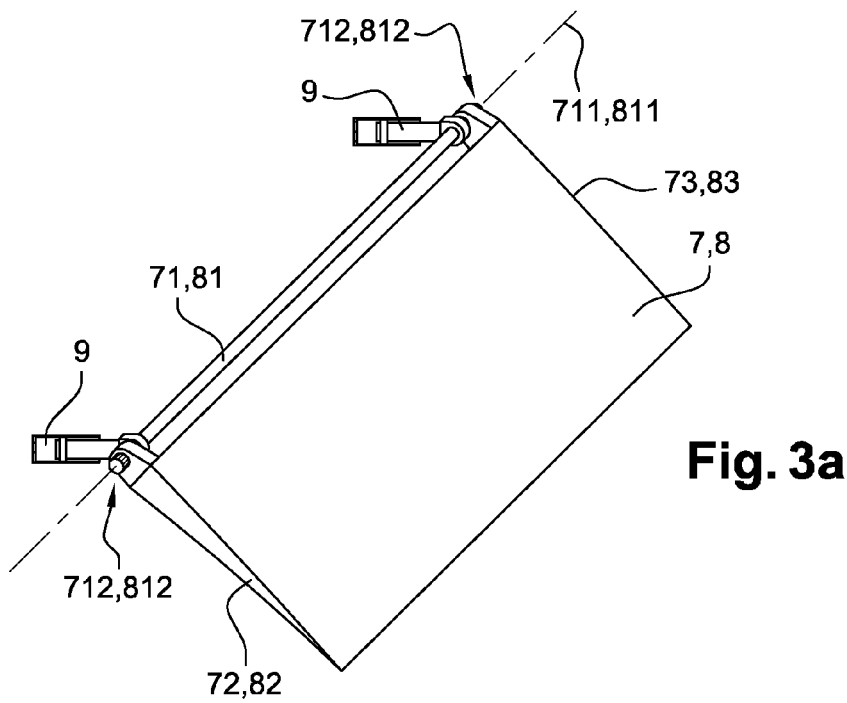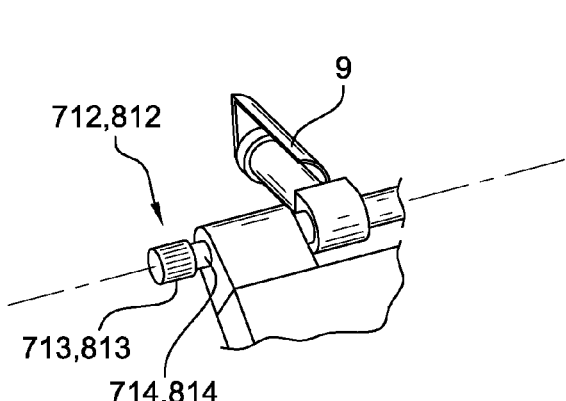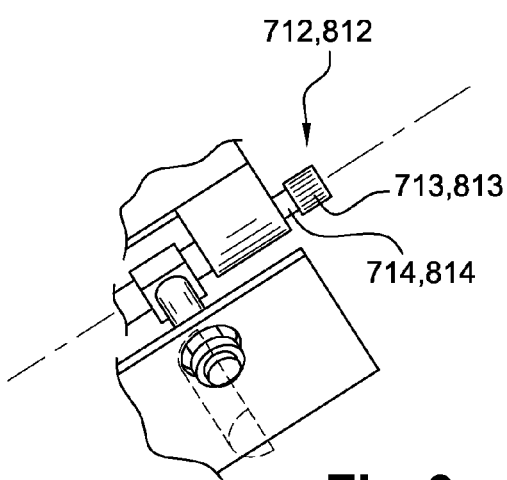

AERODYNAMIC FLIGHT CONTROL SURFACE SAID OF CROCODILE STYLE FOR AIRCRAFT

CROSS-REFERENCE TO RELATED APPLICATIONS

This application claims priority to and the benefit of French Application No. 09 57947 filed on 10 Nov. 2009, the disclosures of which are incorporated by reference in its entirety.

The aspects of the disclosed embodiments relate to the field of aircraft that utilize aerodynamic airfoils, for example civilian aircraft or military transport aircraft.

More particularly the aspects of the disclosed embodiments relate to an airplane whose control of certain axes is provided for by airfoils called crocodile airfoils.

BACKGROUND

Aircraft, particularly in the field of transport aircraft, generally make use of aerodynamic control airfoils distributed over the aerodynamic surfaces to control motions around the center of gravity of the aircraft: wings or fins, on the fuselage.

The aerodynamic airfoils are most often dedicated to a function due to their principal effects on the aircraft: ailerons to control torque around the roll axis, elevators to control torque around the pitch axis, directional airfoils to control torque around the yaw axis, aerodynamic brakes to control aerodynamic drag, and lift destroyers or "spoilers" to control the aerodynamic lift of the wing.

To combine the effects of an attitude control airfoil: aileron, depth or directional control airfoil, with those of aerodynamic brakes, it is known how to utilize airfoils called crocodile airfoils.

The crocodile airfoils placed at the ends of the wing can also serve to create yaw torques in particular for control around the yaw axis on aircraft that do not have yaw fins or that have no rudder. The use of crocodile airfoils as aerodynamic brakes in these cases is a consequence of the possibilities offered by these airfoils.

For example U.S. Pat. No. 1,974,407 shows the case of a crocodile airfoil that has two movable surfaces hinged to the same shaft integral with a rear spar of the wing, forming a top face of the airfoil and with the other forming a bottom face of the airfoil.

The two movable surfaces of such an airfoil when they are joined together and turned simultaneously while remaining joined behave like a conventional airfoil such as an aileron or a directional airfoil in having a similar overall geometry.

When the two movable surfaces are set at different angles apart from one another, they are in different orientations with respect to the aerodynamic flow and also behave like an aerodynamic brake.

The Patent Application GB 722842 or Application WO 2007/068450 show another embodiment of a crocodile airfoil in which the two movable surfaces forming the airfoil are hinged individually, to be more or less removed symmetrically relative to a central plane, to a forward section itself hinged to the aircraft structure, to be turned in unison.

The advantage of such crocodile airfoils accordingly is to be able to accomplish the two airfoil functions on the one hand by simultaneously setting the movable surfaces constituting the airfoil, and on the other hand by differential aerodynamic braking of these movable surfaces, with the ability to combine the two modes.

Such crocodile airfoils, however, are still seldom used, principally because of installation problems posed by the proposed embodiments.

The airfoils such as ailerons, elevation or directional airfoils, are hinged on the side of the trailing edge of the load-bearing aerodynamic surface with which they are associated, such as a wing, a horizontal or vertical fin, in other words in a zone of reduced thickness.

The installation of two movable surfaces to be hinged for being set individually in this reduced thickness involves difficulties in structural design of the movable surfaces, and especially of their hinges and the absorption of forces on the rear spar of the load-bearing aerodynamic surface, and on the installation of the drivers necessary to provide for setting the two movable surface, everything being done with aerodynamic sacrifices as small as possible.

These installation difficulties lead to complex and heavy assemblies that introduce limitations into the settings of the two movable surfaces of the crocodile airfoil, and do not permit deriving any benefit that can be expected from a crocodile airfoil.

Also, the different hinges and the motions associated with these installation conditions lead to maintaining the functional play of parasitic aerodynamic drag and act to disfavor the aerodynamic balance of the crocodile airfoils.

SUMMARY

To resolve these difficulties and drawbacks of crocodile airfoils, the trailing edge aerodynamic airfoil of an aircraft load-bearing aerodynamic surface according to the disclosed embodiments has two airfoil flaps, in a manner similar to known crocodile airfoils, each of which according to the disclosed embodiments and independently of one another is movable in translation and movable in rotation around an axis of rotation of the airfoil flap, with the axes of rotation of the two airfoil flaps being essentially parallel to one another.

The motion in translation permits creating a space or clearance between the structure of the load-bearing aerodynamic surface and the airfoil flap, which allows making the movement in rotation without mechanical interference with the structure of the load-bearing aerodynamic surface.

Each airfoil flap has a position called the zero setting in which each of the two flaps of an airfoil are essentially contiguous, so as to form a rear section of the load-bearing aerodynamic surface.

In a preferred embodiment, each airfoil flap, movable in translation relative to the load-bearing aerodynamic surface independently of the other airfoil flap, is driven in rotation relative to the load-bearing aerodynamic surface around its axis of rotation by its movement in translation.

Thus the settings of the flaps of an airfoil are performed independently by a translation, without the necessity of using rotational drivers, whose installation requires a larger space than the translational drivers.

To provide precise guidance of the flaps in translation, each airfoil flap is fastened to a rotational shaft, whose axis corresponds to the axis of rotation of the airfoil flap, a rotational shaft that has extensions that work together with the guide runners fastened to the load-bearing aerodynamic surface, for example to ribs of this load-bearing aerodynamic surface close to the ends of the span of the aerodynamic airfoil, runners that determine a trajectory of the airfoil flap while it moves in translation.

To provide for the rotation of the airfoil flaps simply from their translations, at least one extension of the shaft of rotation of each airfoil has a rotational entrainment device acting together with the load-bearing aerodynamic surface to modify the setting of the associated airfoil flap when this airfoil flap is moved in translation.

The rotationally entraining device works together with the load-bearing aerodynamic surface to turn the airfoil flap concerned toward the face of the flap, called the external face, subjected to aerodynamic flow when the aircraft is in flight, when the flap is moved in translation, so that the setting toward the outside is associated with a flap moving away, which favors its disengagement from the surrounding structures of the load-bearing aerodynamic surface during the setting, and from the other airfoil flap, to form the clearance necessary for the rotation.

To provide the double airfoil function acting by modification of the local lift of the load-bearing aerodynamic surface and of the aerodynamic drag that generates aerodynamic braking, each airfoil flap is moved in translation independently of the other flap by at least one driver, advantageously two or more drivers dividing the forces on the airfoil flap and/or providing redundancy in case of the failure of one driver.

An example of such a driver is a linear driver that is integral with a first end of the load-bearing aerodynamic surface and integral with another end of the airfoil flap, the elongation of which displaces the airfoil flap in translation.

The linear driver or drivers have an axis of force application essentially perpendicular to the axis of rotation of the airfoil flap to entrain the flap in translation optimally, or shifted as the case may be, to the extent of the space that may be occupied by the drivers and their connectors to the flap, relative to the axis of rotation toward a side opposite the external face of the flap, so as to generate a torque countering the torque generated by the aerodynamic forces on the set flap.

In a particularly advantageous embodiment in terms of volume and integration with the structure, as well as in terms of reliability, the rotational entrainment device is a sprocket or a pinion working together with a rack fastened to the load-bearing aerodynamic surface and parallel to the guide runner. A pinion is preferably fastened to the rotational entrainment shaft at each end of the shaft of an airfoil flap at the ends of the airfoil span.

To provide for a suitable setting direction, in other words toward the exterior face of the flap when the flap is translated toward the rear of the load-bearing aerodynamic surface, the rack of the rotational entrainment device of an airfoil flap is preferably located toward the external face of said airfoil flap relative to the sprocket or pinion.

To take into account different aerodynamic efficacies between the two sides of the load-bearing aerodynamic surface in the case of a wing or a horizontal fin, the ratio between the setting of a flap and the translation of this flap is preferably different for each of the two flaps of said aerodynamic airfoil, advantageously inversely proportional to the aerodynamic efficacy attributed to each of the flaps.

When the setting of an airfoil flap is desired only toward its exterior face, the translational motion of the airfoil flap has a limiting forward position relative to the load-bearing surface for which this flap is in the zero angular setting position in which its external face is a continuation of the load-bearing aerodynamic surface.

When a setting of an airfoil flap has to be able to be accomplished in the two directions relative to the zero setting position, the zero setting position advantageously corresponds to an intermediate position in translation between the limiting forward position and the limiting rear position of the extensions of the shaft in the guide runners.

In an embodiment to obtain a maximized aerodynamic drag from the airfoil flaps in the aerodynamic braking operating mode, the translational motion of an airfoil flap includes a limiting rear position relative to the load-bearing aerodynamic surface for which the flap is in position set at an angle of rotation of said flap greater than or equal to 90 degrees relative to the zero setting position.

Depending on the desired displacements of the airfoil flaps during the displacements in translation, the guide runners of an airfoil flap at least are rectilinear, or the guide runners of an airfoil flap at least are curved inward over at least a portion of their lengths, and determine a non-rectilinear trajectory of the translational motion of the flaps involved, which for one thing permits avoiding mechanical interference with the surrounding structure and/or controlling functional play.

The disclosed embodiments are applicable to any type of trailing edge airfoil of an aircraft's load-bearing aerodynamic surface, and in particular to a trailing edge aileron of an airplane wing, or to an elevator airfoil of a vertical airplane fin, or to a directional airfoil of a vertical airplane fin.

The disclosed embodiments also relate to an airplane of which at least one load-bearing surface is provided with such an aerodynamic airfoil to accomplish control of roll and/or of yaw and/or of pitch, while providing an aerodynamic braking function if needed.

BRIEF DESCRIPTION OF THE DRAWINGS

The crocodile airfoil and the aircraft pursuant to the disclosed embodiments are described with reference to the Figures, which show schematically:

FIG. 2: a perspective representation of a section of the wing between the ribs defining the zone of the crocodile airfoil;

FIG. 3a: a perspective view of an aileron flap and of its drivers isolated from the other sections of the wing;

FIGS. 3b and 3c: detail views from different perspectives of the end of the aileron flap of FIG. 3a in a hinged area of the aileron flap;

DETAILED DESCRIPTION

An example of embodiment of the disclosed embodiments is described in detail below describing a crocodile aileron installed on an aircraft wing.

The design details of a crocodile airfoil associated with a load-bearing aerodynamic surface of an aircraft, as detailed in the case of a wing aileron, are readily transposable to any airfoil of similar geometry, such as an elevator of a horizontal fin or a directional airfoil of a vertical fin.

Figure 1A:
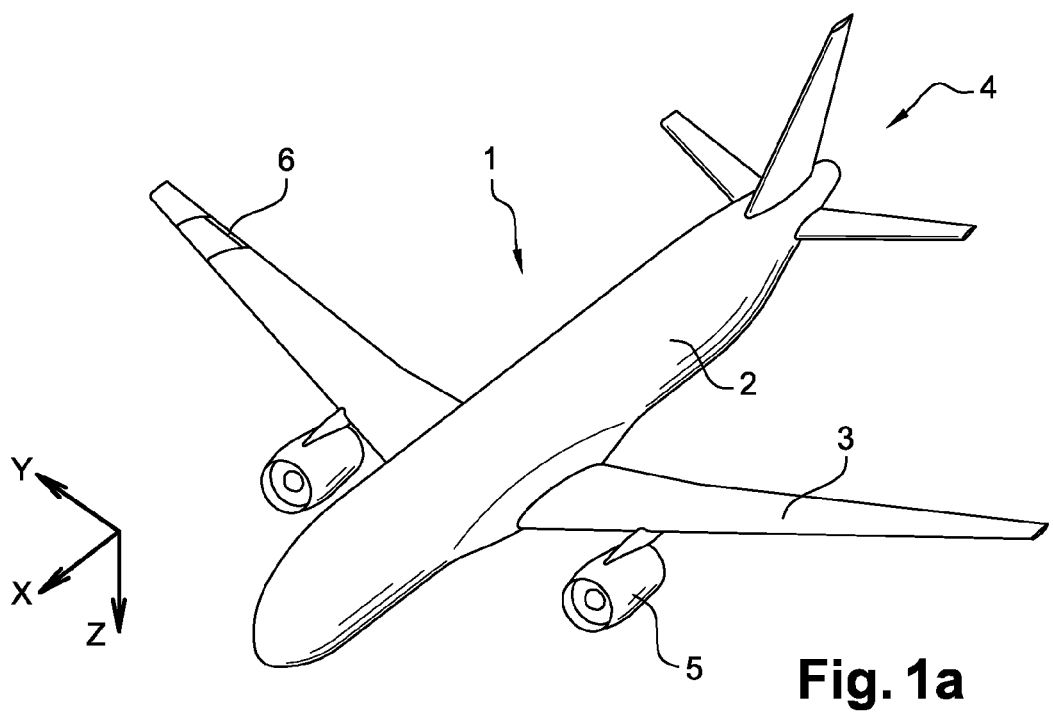
FIG. 1a: a perspective view of an example of an aircraft in cruising flight configuration.

FIG. 1a shows an airplane 1 with conventional architecture that has principally a fuselage 2, a wing 3, jet engines 5 fastened beneath the wing, and a tail assembly 4 fastened to the fuselage in a section of the fuselage behind the wing 3.

The aircraft 1 is associated for the needs of the description with a conventional frame of reference defined by three orthogonal directions:

an X direction parallel to a longitudinal axis of the aircraft, parallel to an axis of the fuselage, oriented positively toward the front of the aircraft in the direction of motion in flight;

a Z direction perpendicular to the X direction and oriented positively to below the aircraft when the aircraft is in horizontal flight;

a Y direction perpendicular to a plane XZ determined by the X and Z directions, oriented positively toward the right of the aircraft.

The expressions relative to position or direction accordingly have the common meanings that they are in a frame of reference of the aircraft, specifically:

in front of or toward the front signifies in the direction of positive X, and behind or toward the rear in the direction of negative X;

below or downward signifies in the direction of positive Z, and above or upward in the direction of negative Z;

on the right or toward the right signifies in the direction of positive Y, and on the left or toward the left in the direction of negative Y, on a side signifying either the side of positive Y or negative Y, depending on the case.

Conforming to the conventions in the field of aircraft design, for the rotations or torques, reference is made to the roll angles around a roll axis of rotation of the aircraft parallel to the X direction, pitch angles around a pitch axis parallel to the Y direction, and yaw angles around a yaw axis parallel to the Z direction.

Figure 1B:
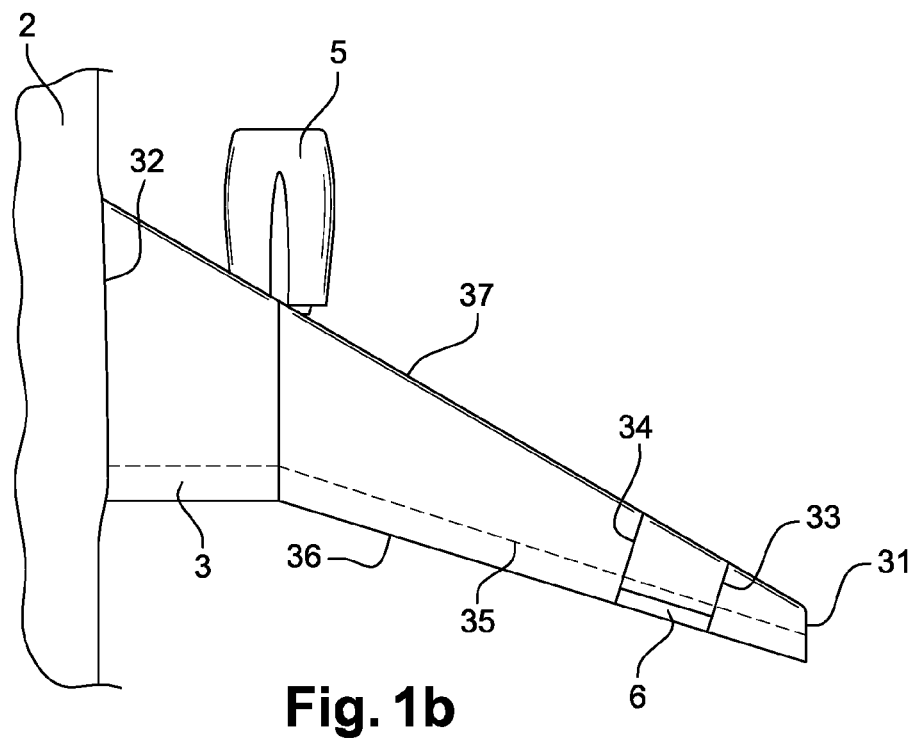
FIG. 1b: a top view of one side of the wing of the aircraft of FIG. 1 that has a crocodile airfoil.

The aircraft 1 of the disclosed embodiments, as shown in FIGS. 1a and 1b, has at least one crocodile aileron 6 integral with the wing 3.

The aileron 6 extends along a span of the wing between an inside rib 34 located beside a root 32 of the wing at the fuselage 2 and an outside rib 33 beside an end 31 of the wing opposite the fuselage.

For essentially structural reasons, in the example illustrated, the ribs are not strictly parallel to the longitudinal X direction of the aircraft but are oriented essentially perpendicular to the rear spar 35 of the wing 3 and are accordingly deviated longitudinally by an angle corresponding to the sweep of said rear spar. This deviation does not modify the principle of the disclosed embodiments.

The outside spar 33 and inside spar 34 are part of the structure of the load-bearing aerodynamic surface, in this case the wing of the aircraft, and are accordingly fastened to said wing.

The aileron 6 extends along cords of the wing between a trailing edge 36 at the back of the wing and a rear spar 35 of the wing, for example a spar constituting a rear wall of a structural compartment of the wing 3 located in front of the trailing edge 36 and behind a leading edge 37 of the wing.

As illustrated in FIG. 2, the crocodile aileron 6 has two airfoil flaps, in this case aileron flaps, each extending on the wingspan and on the cord similarly to the aileron 6, with a first flap located in an upper part of the wing, called the extrados flap 7, and a second flap located in a lower part of the wing, called the intrados flap 8.

FIGS. 3a, 3b, and 3c show only the structure of the wing, one of the aileron flaps with two drivers, and details of this flap.

Each aileron flap 7,8 is integral with a rotational shaft 71 or 81, respectively, whose longitudinal axes 711 and 811 respectively determine the axis of rotation of the extrados flap 7 and the intrados flap 8 respectively, oriented essentially parallel to the spar 35 in a forward section of the aileron flap.

The rotational shaft 71, 81 is also fixed relative to the corresponding aileron flap 7, 8, so that entrainment by said rotational shaft modifies a corresponding angular position of said aileron flap around the longitudinal axes 711 and 811, respectively, in other words a setting of the aileron flap.

As shown in the details of FIGS. 3b and 3c, the aileron flap 7, 8 has an extension 712 or 812, respectively, of the rotational shaft 71 or 81, respectively, at each of the ends along the span of said flap.

Said extensions extend along the span of the aileron flap 7, 8 beyond the lateral edges 72, 73 of said flap 7, or 82, 83 of the flap 8, at each end of said aileron flap.

Figure 4A:
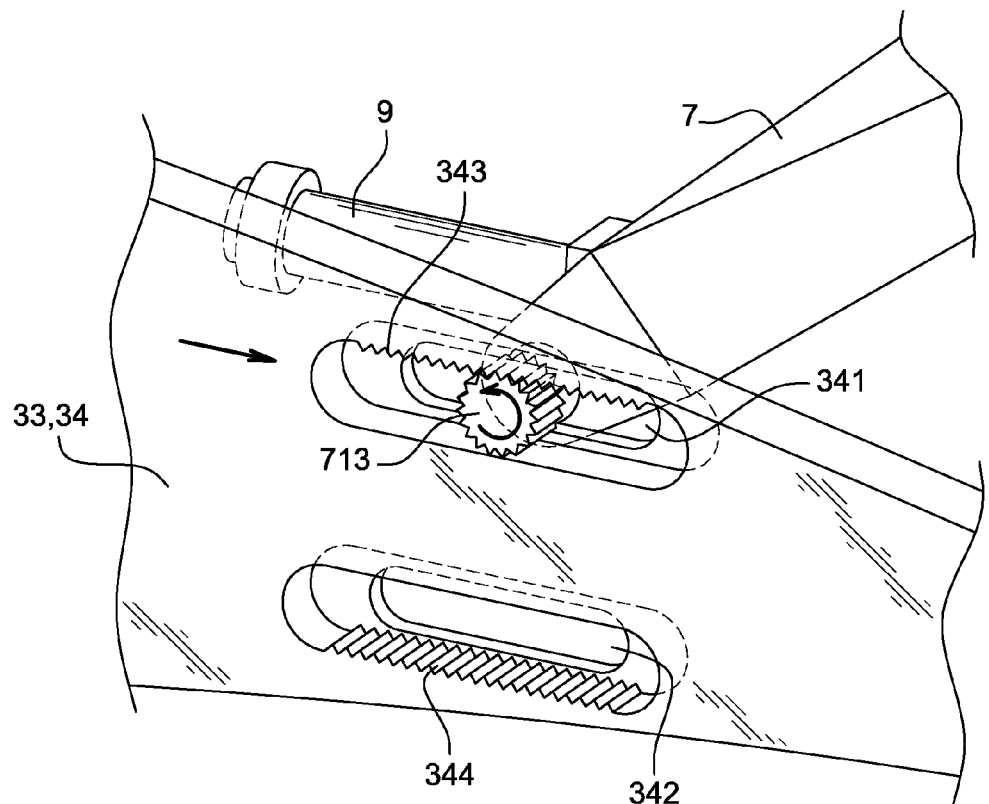
FIGS. 4a and 4b: perspective views of a rib showing by transparency the interactions with the rotational shaft of the top face flap, FIG. 4a, and of the bottom flap, FIG. 4b, of the crocodile aileron.
Figure 4B:
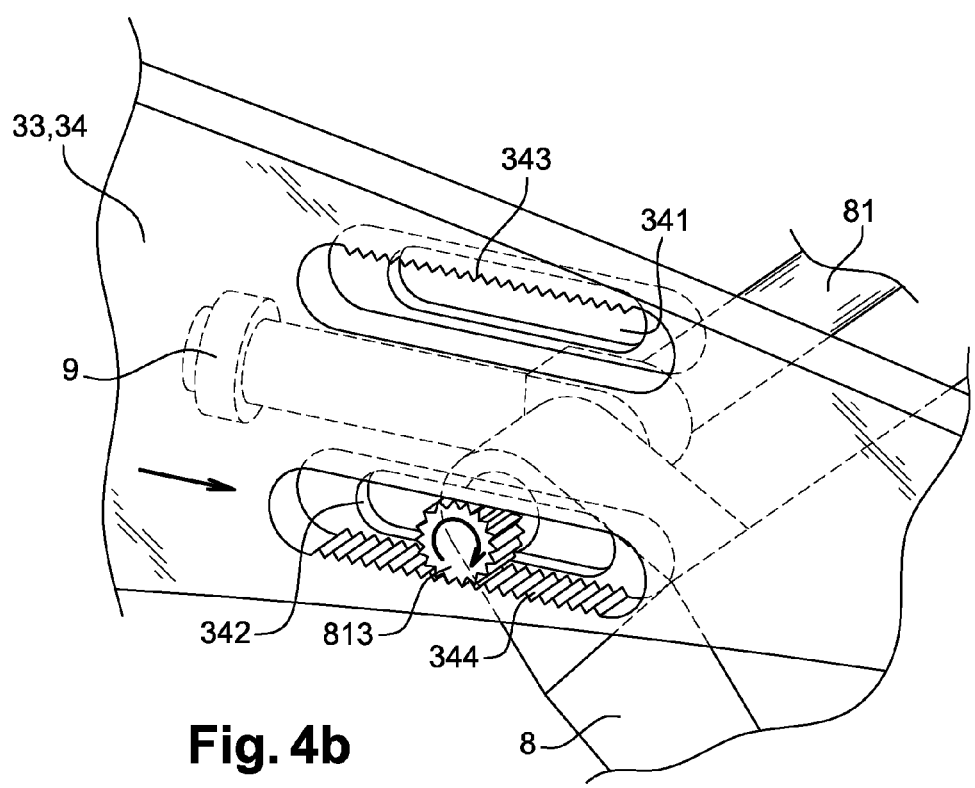

Otherwise, as shown in detail in FIGS. 4a and 4b, each aileron flap 7, 8 is mounted with mobility in translation relative to the wing 3, in particular relative to the rear spar 35 of the wing 3, along a longitudinal direction essentially perpendicular to the direction of the axis of rotation 711 or 811, respectively, and parallel to the external rib 33 and internal rib 34.

During a motion in translation of an aileron flap 7, 8, said aileron flap is guided at each of its ends along the span by the extensions 712 or 812, respectively, of its rotational shaft in cooperation with the runners 341 or 342, respectively, or other elements for guidance in translation of the rotational shafts 71 and 81, respectively.

The runners 341, 342 are fastened to the structure of the wing, made on the internal rib 34 and external rib 33 encasing the aileron along the wingspan so that each aileron flap 7, 8 is guided at the two ends of its rotational shaft 71, 81.

The aileron flap is preferably made so that its lateral edges 72, 73, 82, 83 have minimal clearance from the surfaces relative to the internal rib 34 and external rib 33.

Each of the rotational shafts 71, 81 also has at least one rotational entrainment device whose rotation is induced by the translation of the corresponding aileron flap.

As in the example of embodiment illustrated in the various figures, the rotational entrainment device, for example, is a pinion 713, 813 of the extension 712 and 812, respectively, or a sprocket fastened to the rotational shaft 71 or 81, respectively.

The pinion 713, 813 is kept connected by the runner 341 or 342, respectively, to a rack 343 parallel to the runner located at the same end of the rotational shaft and fixed relative to said runner.

Advantageously, as illustrated in FIG. 3a, each end along the span of the aileron flaps 7, 8 is provided with such entrainment devices associated with each of the ribs, internal 34 and external 33, to provide for symmetrical distribution of the torsional forces on the rotational shaft 71, 81 of said aileron flap.

Each aileron flap 7, 8 has one or more drivers 9 integral with the structure of the wing, for example fastened at a first end to the rear spar 35 to absorb tensile and compressive forces from the driver, and integral with the aileron flap at a second end to exert forces in the direction of displacement of the shaft 71, 81 respectively in the runner 341 or 342, respectively.

In the example of embodiment illustrated in FIGS. 4a and 4b, two drivers 9 are provided for each aileron flap 7, 8 close to the ends along the span of the aileron flap, to distribute the forces exerted by the drivers on said aileron flap close to the rotational entrainment devices.

The driver or drivers 9, advantageously linear drivers, are preferably fastened at their second ends by hinges on the rotational shaft 71, 81 or to the aileron flap 7, 8, so that a principal tensile or compressive axis of the driver is essentially perpendicular to the axis of rotation 711, 811 of the flap.

Also, the rotational entrainment devices 713, 813 are made so that when the shaft 71, 81 is moved in translation toward the rear of the wing 3, accordingly, toward the trailing edge 36, in the runner 341, 342, relative to a neutral position, the translated aileron flap 7, 8 is entrained in rotation in a direction tending to distance it from the other aileron flap, in other words, when being translated toward the rear, the extrados flap 7 is set upward, and the intrados flap 8 is set downward.

In practice, each airfoil flap, when it is displaced in translation toward the rear, is set toward a face of said flap, called the external face, that is subjected to the aerodynamic flow outside of the aircraft when the aircraft is in flight.

In the illustrated case of entrainment devices that have a pinion 713, 813 of the shaft 71, 81 of the flap 7, 8, acting together with a rack 343, 344, the result desired is obtained when said rack is located relative to the pinion on the extrados side of the wing 3 for the extrados flap 7, and on the intrados side of the wing for the intrados flap 8.

In the example illustrated in the figures, the guidance is provided at each end of the rotational shaft 71 by a cylindrical zone with circular cross section 714, 814 of the extension 712 or 812, respectively, with a diameter adjusted to the width of the runner 341 or 342, respectively, of the internal rib 34 and external rib 33, and the pinions 713, 813 of the rotational entrainment devices are fastened to the ends of the extensions 712, 812 so that the cylindrical zones 714, 814 are located between the aileron flap itself and the pinion, with the runners 341, 342 and the racks 343, 344 being made consequently on the internal and external ribs 34 and 33, respectively.

However, other versions are possible, for example such as having the pinion fastened to the rotational shaft on the side of the aileron flap, and the cylindrical zone on the outside of the flap relative to the pinion, and with the rack then also being reversed relative to the guide runner on the rib.

Considering an aileron flap, for example the extrados flap 7 illustrated in FIG. 4a, when the driver 9 or the drivers acting in a coordinated manner displace said extrados flap toward the rear by pushing on said flap, the rotational shaft 71 fastened to the extrados flap 7 is entrained in rotation by the action of the rack 343, fixed relative to the rib, on the pinion 713 of the shaft extension 712, and this is preferred at each end of the rotational shaft 71.

The runner 341 provides the longitudinal guidance of the flap by the cylindrical part 714 of the extension 712, and keeps the pinion 713 in contact with the rack 343 with which said pinion is engaged.

Thus for each position of the rotational shaft 71 along the runner 341 there is a corresponding angular position of said rotational shaft; in other words the angular position, the setting, of the extrados flap 7 is determined by its more or less remote position relative to the wing 3 or to the rear spar 35 of said wing.

It should be understood that the choice of the ratio of mechanical transmission between the rack 343 and the pinion 713 is determined by a useful diameter of said pinion, and with this ratio being fixed, the angular excursion of the aileron flap 7 is determined by the possible course of the rotational shaft 71 in the runner 341, which determines a forward limit and a rear limit for the position of said rotational shaft.

In the preferred form of embodiment illustrated, when the rotational shaft 71 is at the forward limit position, the extrados flap 7, also in a forward limit position, is in a zero setting position, in other words said extrados flap is an aerodynamic continuation of the extrados of the wing 3 of which it is part.

Also, in this forward limit position, a clearance between the extrados flap 7 and the extrados of the section of the wing 3 in front of said extrados flap is minimized, with contact elements, for example elastomeric joints, not shown, being able to provide an airtight seal between the movable flap and the structure of the wing to improve the quality of aerodynamic flow in this zone.

When the extrados flap 7 is displaced toward the rear to be set upward, said extrados flap is partly disengaged from the fixed structure of the wing 3, with the increased clearance thus facilitating a setting with no mechanical interference, and with any wear of contact elements being practically suppressed.

In the rear limit position of the rotational shaft 71 in the runner 341, the extrados flap is in a maximum setting position, with this setting being able to reach, if necessary, an angle equal to or greater than 90 degrees with no problem, by design.

The intrados aileron flap 8 functions in an entirely similar manner relative to the intrados of the wing 3, with the setting in this case being accomplished between a zero position setting and a maximum downward setting position.

Each aileron flap being provided with its own drivers 9 that can be controlled independently, the aircraft of the disclosed embodiments is able to drive individually the intrados flap 8 and the extrados flap 7 of an aileron 6.

In a neutral position, each aileron flap is in the longitudinal position corresponding to the zero setting position.

In this position, the exterior faces of the aileron flaps, i.e. the surfaces in contact with the aerodynamic flow around the wing when the aircraft is in flight, reconstitute the exterior geometric form of the wing that said wing would have if it were deprived of the aileron.

The two aileron flaps, in this position, are close to one another and are joined at least at the trailing edge.

In an operating mode of a wing aileron, i.e. un operation in which an aerodynamic force is to be generated by the aileron either upward or downward, to generate a torque around the roll axis of the aircraft 1, a single aileron flap is set.

Figure 5A:
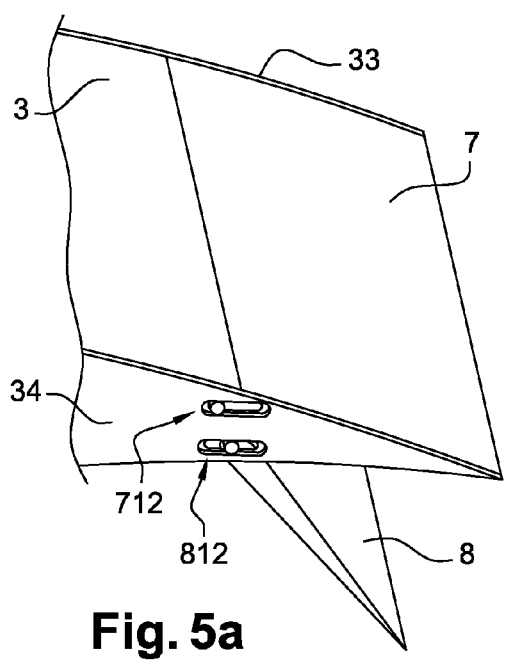
FIG. 5a: a perspective representation of the zone of the crocodile aileron with only the bottom flap set.

When the desired aerodynamic force is to be generated upward, the intrados flap 8 is set downward, as illustrated in FIG. 5, by a distancing movement of said intrados flap, with the position of the extrados flap 7 not being modified. The value of the setting is modulated as a function of the intensity of the effect desired, by acting on the value of the displacement in translation of said intrados flap.

In a symmetrical fashion, when the desired aerodynamic force is to be generated downward, the extrados flap 7 is set upward and is modulated by a longitudinal displacement of said extrados flap, with the position of the intrados flap 8 not being modified.

Figure 5B:
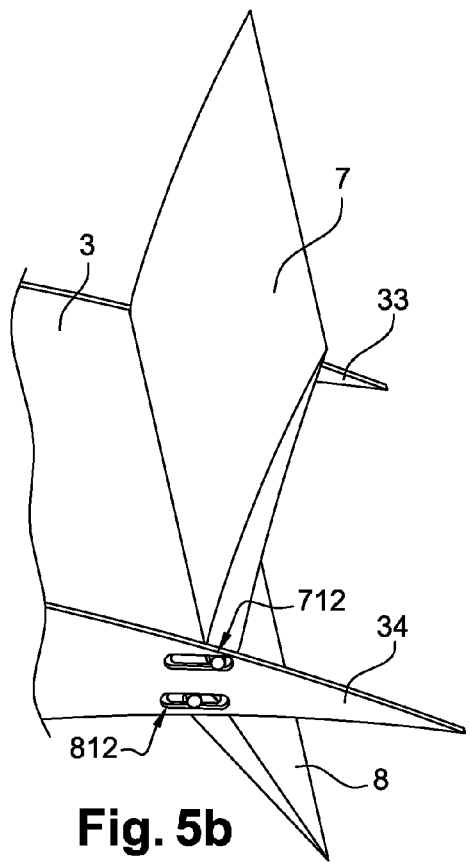
FIG. 5b: a perspective representation of the zone of the crocodile aileron with the top and bottom flaps set in different positions.
Figure 6:
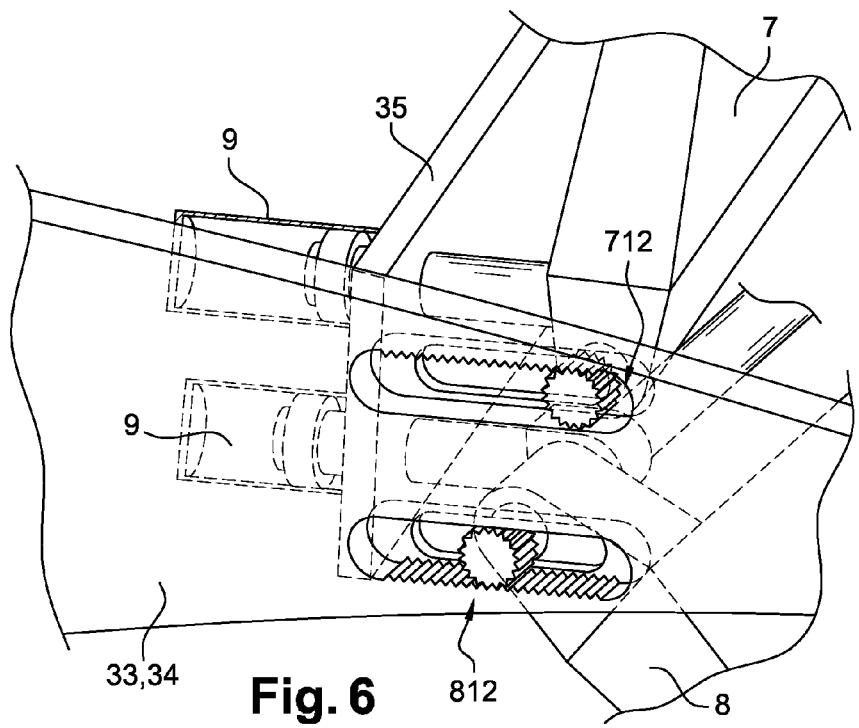
FIG. 6: a perspective view of a rib showing by transparency the rotational shafts of the crocodile aileron in the position of FIG. 5b.

In an aerodynamic braking mode of operation of the crocodile flap 6, the two aileron flaps, the intrados flap 8 and the extrados flap 7, are displaced in translation to be set simultaneously, as illustrated in FIG. 5b.

In the pure aerodynamic braking mode, in other words without creating a torque around the roll axis of the aircraft, the respective settings of the two aileron flaps are symmetrical with regard to their respective lifts, so as to generate aerodynamic drag with a zero, or at least negligible, effect on the resultant lift from the simultaneous setting. In practice, the setting of the intrados flap 8 can be perceptibly different in value from that of the extrados flap 7 because of different aerodynamic efficacies on lift between the intrados and extrados of the wing 3.

The difference in settings between the two airfoil flaps, for example, is obtained by different translations of the two flaps.

In a variant of embodiment, the rotational entrainment device of an airfoil flap is made with a ratio between the rotation of said flap and its translation that is different from the equivalent ratio of the other flap, for example by a different diameter of the pinion fixed to the rotational entrainment shaft.

In this variant, the ratios between rotation and translation of each of the two flaps of the same airfoil are advantageously chosen so that the same translation of the two flaps, which then have different setting angles, produces a symmetrical aerodynamic effect on lift on the load-bearing aerodynamic surface, and accordingly in principle creates only the aerodynamic drag.

In operation, the settings of each of the aileron flaps are combined in function, on the one hand by the desire for local lift according to the aileron mode, and on the other hand by the desire for aerodynamic drag according to the aerodynamic braking mode.

Figure 7A:
FIGS. 7a to 7g: illustrations of a section of the wing showing different examples of positions of the aileron flaps.
Figure 7B:
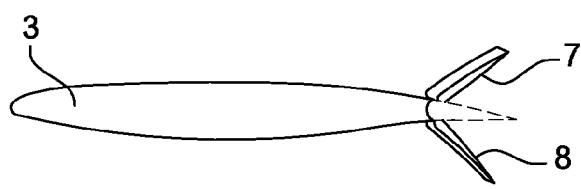
Figure 7C:
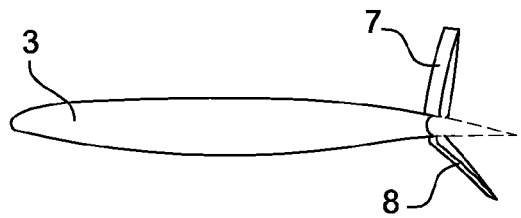
Figure 7D:
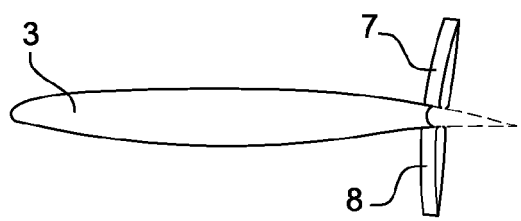
Figure 7E:
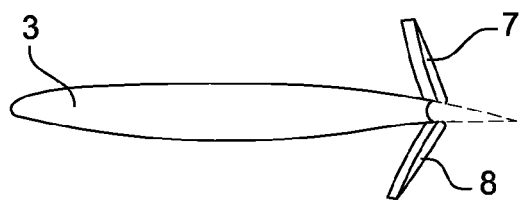

The possibility of independently setting the two aileron flaps thus permits blending the two functions, which may lead, as illustrated in FIGS. 7a to 7e by way of example of cross sections of the wing 3, to:

FIG. 7a: a zero setting reference position in which the intrados flap 8 and extrados flap 7 are in a position restoring a nominal profile of cross sections of the wing in cruising configuration;

FIG. 7b: an essentially symmetrical setting position of the intrados flap 8 and extrados flap 7 corresponding to use in an aerodynamic braking mode;

FIG. 7c: an asymmetric braking position of the intrados flap 8 and extrados flap 7 in which the setting of said extrados flap is greater than that of FIG. 7b;

FIG. 7d: a symmetrical setting position of the intrados flap 8 and extrados flap 7 corresponding to a use in aerodynamic braking mode with the settings close to 90 degrees, higher than those shown in FIG. 7b;

FIG. 7e: a symmetrical setting position of the intrados flap 8 and extrados flap 7 corresponding to a use in aerodynamic braking mode with the maximum settings greater than 90 degrees.

Figure 7F:
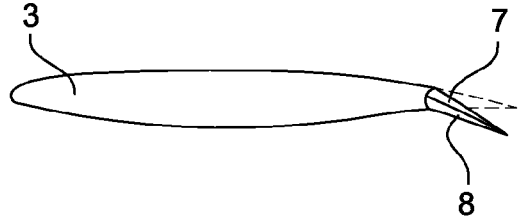
Figure 7G:

FIGS. 7f and 7g show positions in which the intrados and extrados flaps are set in the same direction, downward in FIG. 7f and upward in FIG. 7g, in an embodiment in which an airfoil flap can be set in the two directions of rotation relative to the zero setting position, as will be described in detail in the description below.

The elevated dynamics and high amplitude of the settings in the aerodynamic braking mode permit the aircraft 1 to obtain great efficacy in said aerodynamic braking mode, and the crocodile ailerons 6 are advantageously put to use to control the vertical trajectory and the speed of the aircraft, and also to control the movements of the aircraft around the yaw axis by using an aerodynamic braking operation that is asymmetric between an aileron on the left side of the wing relative to the fuselage and an aileron on the right side of the wing.

The detailed description given as an example of embodiment of an aircraft 1 pursuant to the disclosed embodiments is not limiting.

Thus, any aerodynamic airfoil hinged in a trailing edge zone of a load-bearing surface of an aircraft, i.e. a profiled structure intended to generate an aerodynamic lifting force regardless of its direction in the frame of reference of the aircraft, can be produced following the principle of the aileron described in detail.

The principles of the disclosed embodiments are applicable to the case of airfoils of a horizontal fin. These principles are also applicable to a vertical fin airfoil, with the intrados and extrados flaps in this case being replaced by a right flap and a left flap with reference to the side of the vertical fin on which it is located.

One skilled in the art is also able to adapt the described principles without departing from the scope of the present disclosed embodiments.

Thus, the rotational shaft of an aileron flap, for example is integrated into the structure of said aileron flap, said rotational shaft being evident only at the extensions and at the zones of input of the drivers on said rotational shaft corresponding to indentations in the structure of the aileron flap.

Although less favorable according to a criterion of the occupation of available space between the two aileron flaps, a space that may be limited to the requirements of two functional clearances in the case described in detail and that permits maximizing the thickness of said aileron flaps and accordingly minimizing their structural weight, the point of application of the forces from the drivers on an aileron flap may be shifted relative to the axis of the rotational shaft. By shifting the point of application toward the inside of the wing relative to the flap considered, in other words downward for an extrados flap or upward for an intrados flap, the force developed by a driver to displace the aileron flap under consideration toward the rear also produces a torque relative to its axis of rotation, which is exerted on the flap in the same direction as the rotational entrainment devices, which are thus relieved, and against the aerodynamic forces that tend to oppose the setting of the aileron.

In another mode of embodiment, the movements in translation and rotation of an aileron flap are each accomplished by a different driver, and the motions of each of these drivers are coordinated by a flight control system.

In one form of embodiment, the runners of an aileron flap are not straight but follow a more or less complex profile to swing the axis of rotation of said flap upward or downward, depending on its more or less remote position.

Depending on the desired effects, the flap may be separated from a central plane of the wing or on the contrary may be brought close to this central plane, provided that the geometry and the configuration of the other aileron flap are not the source of mechanical interference.

A guide runner, for example, is curved or may have a straight section and a curved section, for example toward an end of the runner.

Similarly, the guide runners of the two aileron flaps carried by a rib may be divergent or convergent, depending on the desired effects on the aerodynamic interactions between the two flaps.

With respect to the rules for installing airfoil drivers, the drivers 9 that provide for the displacement of the aileron flaps in translation in the runners of the ribs, both at the end fastened to the structure of the wing and at the end fastened to the aileron flap, are provided with ball-and-socket joints and bearings, or ball bearings as needed.

In one form of embodiment, the cylindrical zones 714, 814 of the extensions of the rotational shafts 712, 812 do not move directly in the corresponding runners 341, 342, but are associated with slider elements in the runners or carriages. Each carriage has a bore that forms a bearing suitable for the cylindrical zone of the extension. In this case the carriage has surfaces in contact with the edges of the runner, which permits better distribution of the forces and limits the risks of hammering the parts in contact.

The carriage is made, for example, of a self-lubricating material such as sintered bronze or is integral with the rolling elements such as ball raceways to reduce friction.

In a variant of embodiment, the zero setting position of an aileron flap does not correspond to an end of the runner but to an intermediate position of the rotational shaft in the runner between an extreme forward position and an extreme rear position determining the limits of the longitudinal positions of the flap relative to the load-bearing aerodynamic surface.

Thus, when the aileron flap is in a position in front of the zero setting position, said flap is set in an angular direction opposite to that of a rear position, i.e. the intrados flap is set upward and the extrados flap is set downward relative to the zero setting position of each of said flaps.

This configuration permits to some extent, in particular for settings with moderate amplitude in the aileron mode, combining the settings of the two aileron flaps so that the two aileron flaps remain essentially joined, as illustrated in FIG. 7*f* with the example of a downward setting and in FIG. 7*g* with the example of an upward setting, and improving the efficacy of this mode when the aerodynamic braking function is not necessary.

Each of the two aileron flaps can have at its disposal this ability to be set in the two directions of rotation, but in a particular mode of embodiment only one of the flaps, for example the extrados flap, has this ability, and in this case the combined setting in the same direction, in this example downward as illustrated in FIG. 7*f*, is possible in only a single direction.

As already stated, each aileron flap can be displaced in translation by a single driver, but in practice at least one driver will be arranged close to each end in the span of said flap.

For well known safety reasons in aeronautics, each driver has two or more screws, as the case may be, powered by separate energy sources.

The drivers can be of any type: hydraulic, hydroelectric, electric, piezoelectric, etc.

The disclosed embodiments allow for producing an aircraft whose aerodynamic airfoils incorporate an aerodynamic braking function by means of crocodile airfoils whose efficacy in the aerodynamic braking mode is improved in particular by the possibility of large angular excursions of the airfoil flaps without weight and installation sacrifices.

The invention claimed is:

1. An aerodynamic airfoil having a first, top airfoil flap and a second, bottom airfoil flap, the airfoil comprising:
    a first rotational shaft located in a forward section of the first airfoil flap and having a first axis of rotation;
    a second rotational shaft located in a forward section of the second airfoil flap and having a second axis of rotation;
    wherein the first and second axes of rotation of said first and second airfoil flaps are substantially parallel to one another,
    a first guide runner and a second guide runner fastened to the aerodynamic airfoil, for the first and second rotational shafts, respectively, wherein the first and second guide runners comprise a rack located on one of the top or bottom surfaces of the guide runners,
    a first rotational entrainment device and a second rotational entrainment device for said first and second rotational shafts, respectively, wherein the rotational entrainment device comprises a sprocket or a pinion,
    at least first and second linear drivers for driving the first and second airfoil flaps, respectively, in translation,
    wherein the at least first and second linear drivers and the first and second rotational entrainment devices are configured to move the first and second airfoil flaps, respectively, independently of one another, simultaneously in translation and in rotation about the respective axis of rotation of the respective rotational shaft; and
    wherein a translational movement of at least one of the first and second rotational shafts causes the teeth of the sprocket or pinion to engage with the teeth of the rack, which causes the respective flap to rotate about the respective axis of rotation of the respective rotational shaft.

2. The aerodynamic airfoil of claim 1, wherein the at least one extension of the corresponding rotational shaft is configured to act in conjunction with the corresponding guide runner to determine a trajectory of the corresponding airfoil flap during the simultaneous movement in translation and rotation.

3. The aerodynamic airfoil of claim 2, wherein a zero setting position of the airfoil flap corresponds to an intermediate position of the translation movement between a forward limit position and a rear limit position in the guide runner.

4. The aerodynamic airfoil of claim 2, wherein a zero setting position of the airfoil flap corresponds to a forward limit position in the guide runner.

5. The aerodynamic airfoil of claim 2, wherein a position of the airfoil flap set at an angle of rotation greater than or equal to 90 degrees relative to a zero setting position corresponds to a rear limit position in the guide runner.

6. The aerodynamic airfoil of claim 2, wherein the guide runner of the airfoil flap has a curved portion determining a non-rectilinear trajectory of the motion of translation of said airfoil flap.

7. The aerodynamic airfoil of claim 1, wherein the rotational entrainment device is configured to act in conjunction with the aerodynamic airfoil to set the corresponding airfoil flap toward an external face of said flap subjected to an aerodynamic flow when in flight, when the flap is simultaneously moved in translation and rotation.

8. The aerodynamic airfoil of claim 1, wherein the linear driver of each airfoil flap is configured to displace the airfoil flap in translation independently of the other flap.

9. The aerodynamic airfoil of claim 1, wherein the at least one driver comprises a driver shaft for applying forces substantially perpendicular to the corresponding axis of rotation of the airfoil flap, and wherein the driver shaft is hinged to the corresponding rotational shaft.

10. The aerodynamic airfoil of claim 1, wherein the rack is located toward an external face of the corresponding airfoil flap relative to the corresponding sprocket or pinion.

11. The aerodynamic airfoil of claim 1, wherein said aerodynamic airfoil is a trailing edge aileron of an airplane wing, or a directional airfoil of a vertical fin of an airplane.

12. An aircraft that has at least one aerodynamic airfoil, the aerodynamic airfoil comprising
    a first, top airfoil flap and a second, bottom airfoil flap,
    a first rotational shaft located in a forward section of the first airfoil flap and having a first axis of rotation;
    a second rotational shaft located in a forward section of the second airfoil flap and having a second axis of rotation;
    wherein the first and second axes of rotation of said first and second airfoil flaps are substantially parallel to one another,
    a first guide runner and a second guide runner fastened to the aerodynamic airfoil, for the first and second rotational shafts, respectively, wherein the first and second guide runners comprise a rack located on one of the top or bottom surfaces of the guide runners,
    a first rotational entrainment device and a second rotational entrainment device for said first and second rotational shafts, respectively, wherein the rotational entrainment device comprises a sprocket or a pinion, at least first and second linear drivers for driving the first and second airfoil flaps, respectively, in translation, wherein the at least first and second linear drivers and the first and second rotational entrainment devices are configured to move the first and second airfoil flaps, respectively, independently of one another, simultaneously in translation and in rotation about the respective axis of rotation of the respective rotational shaft; and wherein a translational movement of at least one of the first and second rotational shafts causes the teeth of the sprocket or pinion to engage with the teeth of the rack, which causes the respective flap to rotate about the respective axis of rotation of the respective rotational shaft.

* * * * *